US012702252B2

(12) United States Patent
Qian et al.

(10) Patent No.: US 12,702,252 B2
(45) Date of Patent: Aug. 11, 2026

(54) METHOD AND APPARATUS FOR AUTOMATIC COOKING CONTROL BASED ON INTELLIGENT COOKING DEVICE

(71) Applicant: Shenzhen Hione Smart Kitchen Appliances, Inc., Shenzhen (CN)

(72) Inventors: Tian Qian, Shenzhen (CN); Yi Qian, Shenzhen (CN)

(73) Assignee: Shenzhen Hione Smart Kitchen Appliances, Inc., Shenzhen (CN)

( * ) Notice: Subject to any disclaimer, the term of this patent is extended or adjusted under 35 U.S.C. 154(b) by 416 days.

(21) Appl. No.: 18/237,912

(22) Filed: Aug. 25, 2023

(65) Prior Publication Data

US 2024/0349940 A1 Oct. 24, 2024

(30) Foreign Application Priority Data

Apr. 19, 2023 (CN) ......................... 202310464761.1

(51) Int. Cl.
*A47J 36/32* (2006.01)
*A23L 5/10* (2016.01)
*F24C 3/12* (2006.01)
*H05B 6/06* (2006.01)

(52) U.S. Cl.
CPC ................ *A47J 36/32* (2013.01); *A23L 5/10* (2016.08); *F24C 3/126* (2013.01); *H05B 6/062* (2013.01)

(58) Field of Classification Search
CPC . A47J 36/32; A47J 36/321; A23L 5/10; F24C 3/126; F24C 7/082; H05B 6/062; Y02P 90/02
See application file for complete search history.

(56) References Cited

U.S. PATENT DOCUMENTS 10,520,199 B2 * 12/2019 Polster .................... F24C 7/085
2013/0306626 A1 * 11/2013 Torres ................ B65D 81/3446 219/635
2015/0289324 A1 * 10/2015 Rober .................... H05B 6/668 219/707
2022/0099294 A1 * 3/2022 Cowan .................... F23N 1/005

FOREIGN PATENT DOCUMENTS

CN 110794694 A * 2/2020 ............. G05B 15/02

* cited by examiner

*Primary Examiner* — Chad G Erdman

(57) ABSTRACT

A method and an apparatus for automatic cooking control based on an intelligent cooking device, which is applied to an intelligent cooking device, the intelligent cooking device including an intelligent cookware and an intelligent stove, the method including: collecting a present ingredient parameter of a target ingredient and a present cooking temperature, the present ingredient parameter comprising at least an ingredient identification; acquiring a present cooking gear; generating a first cooking control parameter according to the present ingredient parameter, the present cooking temperature and the present cooking gear, the first cooking control parameter comprising at least a first stove control parameter and/or a first cookware control parameter; and controlling the intelligent cooking device to cook the target ingredient according to the first cooking control parameter.

11 Claims, 4 Drawing Sheets

METHOD AND APPARATUS FOR AUTOMATIC COOKING CONTROL BASED ON INTELLIGENT COOKING DEVICE

CROSS REFERENCE TO RELATED APPLICATIONS

The present application claims the benefit of Chinese Patent Application No. 202310464761.1 filed on Apr. 19, 2023, the contents of which are incorporated herein by reference in their entirety.

FIELD OF THE INVENTION

The present application relates to the technical field of intelligent cooking, in particular to a method and an apparatus for automatic cooking control based on an intelligent cooking device.

BACKGROUND OF THE INVENTION

Intelligent cooking devices may automatically complete the cooking work, to a certain extent, freeing the user's hands and improving the user's cooking experience.

However, it is found in practice that most of the intelligent cooking devices on the market perform cooking operations in accordance with a pre-set cooking process, and if there is a cooking situation during the cooking process that is different from the pre-set cooking process, it may lead to the cuisine obtained by the actual cooking of the intelligent cooking device being unsatisfactory, thus affecting the user's experience of the use of the intelligent cooking device. Thus, it is particularly important to propose a technical solution on how to control the cooking process in order to improve cooking accuracy.

SUMMARY OF THE INVENTION

The technical problems to be solved in the present application is to provide a method and an apparatus for automatic cooking control based on an intelligent cooking device, which may intelligently control the cooking process and increase the cooking accuracy.

In order to solve the technical problems mentioned above, disclosed in a first aspect of the present application is a method for automatic cooking control based on an intelligent cooking device, the method including:

- collecting a present ingredient parameter of a target ingredient in the intelligent cookware and a present cooking temperature of the intelligent cookware, the present ingredient parameter including at least an ingredient identification;
- acquiring a present cooking gear of the intelligent stove;
- generating a first cooking control parameter of the intelligent cooking device according to the present ingredient parameter, the present cooking temperature and the present cooking gear, the first cooking control parameter of the intelligent cooking device including at least a first stove control parameter of the intelligent stove and/or a first cookware control parameter of the intelligent cookware; and
- controlling the intelligent cooking device to cook the target ingredient according to the first cooking control parameter of the intelligent cooking device.

As an optional embodiment, in the first aspect of the present application, collecting a present ingredient parameter of a target ingredient includes:

- collecting an ingredient identification of the target ingredient in the intelligent cookware;
- identifying a first ingredient parameter type corresponding to the ingredient identification according to the ingredient identification, the first ingredient parameter type including at least one ingredient parameter type corresponding to the ingredient identification selected from all ingredient parameter types; and
- collecting the present ingredient parameter of the target ingredient according to the first ingredient parameter type.

As an optional embodiment, in the first aspect of the present application, before collecting the present ingredient parameter of the target ingredient according to the first ingredient parameter type, the method also includes:

- identifying an eating preference corresponding to the ingredient identification according to the ingredient identification, the eating preference being used for indicating an eating preference of a diner with respect to the ingredient identification corresponding to the target ingredient;
- collecting the present ingredient parameter of the target ingredient according to the first ingredient parameter type includes:
- collecting a first ingredient parameter corresponding to the first ingredient parameter type according to the first ingredient parameter type;
- identifying a second ingredient parameter type corresponding to the ingredient identification according to the eating preference and the first ingredient parameter type;
- collecting a second ingredient parameter corresponding to the second ingredient parameter type according to the second ingredient parameter type; and
- the present ingredient parameter of the target ingredient is identified according to the first ingredient parameter and the second ingredient parameter, the present ingredient parameter also including a combination of one or more of a present ingredient weight, a present ingredient amount, a present ingredient shape, a present ingredient volume, a present ingredient humidity, a present ingredient color and a present degree of softness or hardness.

As an optional embodiment, in the first aspect of the present application, before generating a first cooking control parameter of the intelligent cooking device according to the present ingredient parameter, the present cooking temperature and the present cooking gear, the method also includes:

- identifying a present cooking process, an ingredient parameter standard corresponding to the present cooking process and a cooking temperature standard corresponding to the present cooking process, the present cooking process being one of the cooking processes of a cooking flow corresponding to the target ingredient, the cooking process including at least one cooking step;
- generating a first cooking control parameter of the intelligent cooking device according to the present ingredient parameter, the present cooking temperature and the present cooking gear includes:
- identifying an ingredient parameter difference according to the present ingredient parameter and the ingredient parameter standard;
- identifying a cooking temperature difference according to the present cooking temperature and the cooking temperature standard;

identifying a standard adjustment factor according to the ingredient parameter difference and the cooking temperature difference based on a preset cooking control algorithm;

adjusting the ingredient parameter standard and the cooking temperature standard according to the standard adjustment factor to acquire a present ingredient parameter standard and a present cooking temperature standard; and generating a first cooking control parameter of the intelligent cooking device according to the present ingredient parameter standard, the present cooking temperature standard and the present cooking gear.

As an optional embodiment, in the first aspect of the present application, before generating a first cooking control parameter of the intelligent cooking device according to the present ingredient parameter, the present cooking temperature and the present cooking gear, the method also includes:

determining whether the target ingredient meets a preset cooking condition;

when it is determined that the target ingredient meets the preset cooking condition, triggering to perform an operation of generating a first cooking control parameter of the intelligent cooking device according to the present ingredient parameter, the present cooking temperature and the present cooking gear;

determining whether the target ingredient meets a preset cooking condition includes:

identifying a doneness weight range corresponding to the target ingredient based on a range-identifying factor, the range-identifying factor including a combination of one or more of an actual cooking process, actual cooking duration, original ingredient weight of the target ingredient and a cooking objective corresponding to the target ingredient, the actual cooking process including cooking steps actually performed from a beginning of a cooking operation to a current moment in time;

collecting a real-time ingredient weight of the target ingredient;

determining whether the real-time ingredient weight falls within the doneness weight range; and identifying that the target ingredient meets the preset cooking condition when it is determined that the real-time ingredient weight does not fall within the doneness weight range.

As an optional embodiment, in the first aspect of the present application, before generating a first cooking control parameter of the intelligent cooking device according to the present ingredient parameter, the present cooking temperature and the present cooking gear, the method also includes:

identifying a pending adjusting cooking device according to the present cooking temperature and the present cooking gear, the pending adjusting cooking device being the intelligent cookware and/or the intelligent stove;

a first cooking control parameter of the intelligent cooking device includes at least a first cooking control parameter of the pending adjusting cooking device;

when the pending adjusting cooking device includes the intelligent stove and the intelligent stove is a gas stove, a first stove control parameter of the intelligent stove includes a combination of one or more of a flame distribution position, a flame density, a flame temperature, a flame jet strength, a flame blast direction and a flame blast duration; and when the pending adjusting cooking device includes the intelligent stove and the intelligent stove is an induction stove, a first stove control parameter of the intelligent stove includes a combination of one or more of an induction stove power, a power duration and a heating position.

As an optional embodiment, in the first aspect of the present application, after controlling the intelligent cooking device to cook the target ingredient according to the first cooking control parameter of the intelligent cooking device, the method also includes:

collecting a real-time ingredient color of the target ingredient and a real-time softness degree of the target ingredient;

identifying a real-time doneness degree of the target ingredient according to the real-time ingredient color and the real-time softness degree;

determining whether the real-time doneness degree meets a preset doneness degree requirement;

when it is determined that the real-time doneness degree does not meet the doneness degree requirement, generating a second cooking control parameter of the intelligent cooking device according to the real-time doneness degree and the doneness degree requirement;

controlling the intelligent cooking device to cook the target ingredient according to the second cooking control parameter of the intelligent cooking device so that the doneness degree of the target ingredient meets the preset doneness degree requirement.

Disclosed in a second aspect of the present application is an apparatus for automatic cooking control based on an intelligent cooking device, the apparatus is applied to an intelligent cooking device, the intelligent cooking device including an intelligent cookware and an intelligent stove, the apparatus including:

a first collecting module, used for collecting a present ingredient parameter of a target ingredient in the intelligent cookware and a present cooking temperature of the intelligent cookware, the present ingredient parameter including at least an ingredient identification;

an acquiring module, used for acquiring a present cooking gear of the intelligent stove;

a generating module, used for generating a first cooking control parameter of the intelligent cooking device according to the present ingredient parameter, the present cooking temperature and the present cooking gear, the first cooking control parameter of the intelligent cooking device including at least a first stove control parameter of the intelligent stove and/or a first cookware control parameter of the intelligent cookware; and a controlling module, used for controlling the intelligent cooking device to cook the target ingredient according to the first cooking control parameter of the intelligent cooking device.

As an optional embodiment, in the second aspect of the present application, the first collecting module includes:

a collecting sub-module, used for collecting an ingredient identification of the target ingredient in the intelligent cookware;

an identifying sub-module, used for identifying a first ingredient parameter type corresponding to the ingredient identification according to the ingredient identification, the first ingredient parameter type including at least one ingredient parameter type corresponding to the ingredient identification selected from all ingredient parameter types; and the collecting sub-module is also used for collecting the present ingredient parameter of the target ingredient according to the first ingredient parameter type.

As an optional embodiment, in the second aspect of the present application, the identifying sub-module is also used for, before the collecting sub-module collects the present ingredient parameter of the target ingredient according to the first ingredient parameter type, identifying an eating preference corresponding to the ingredient identification according to the ingredient identification, the eating preference being used for indicating an eating preference of a diner with respect to the ingredient identification corresponding to the target ingredient;

steps of the collecting sub-module collecting the present ingredient parameter of the target ingredient according to the first ingredient parameter type specifically include:

collecting a first ingredient parameter corresponding to the first ingredient parameter type according to the first ingredient parameter type;

identifying a second ingredient parameter type corresponding to the ingredient identification according to the eating preference and the first ingredient parameter type;

collecting a second ingredient parameter corresponding to the second ingredient parameter type according to the second ingredient parameter type; and the present ingredient parameter of the target ingredient is identified according to the first ingredient parameter and the second ingredient parameter, the present ingredient parameter also including a combination of one or more of a present ingredient weight, a present ingredient amount, a present ingredient shape, a present ingredient volume, a present ingredient humidity, a present ingredient color and a present degree of softness or hardness.

As an optional embodiment, in the second aspect of the present application, the apparatus also includes:

a first identifying module, used for, before the generating module generates a first cooking control parameter of the intelligent cooking device according to the present ingredient parameter, the present cooking temperature and the present cooking gear, identifying a present cooking process, an ingredient parameter standard corresponding to the present cooking process and a cooking temperature standard corresponding to the present cooking process, the present cooking process being one of the cooking processes of a cooking flow corresponding to the target ingredient, the cooking process including at least one cooking step;

steps of the generating module generating a first cooking control parameter of the intelligent cooking device according to the present ingredient parameter, the present cooking temperature and the present cooking gear specifically include:

identifying an ingredient parameter difference according to the present ingredient parameter and the ingredient parameter standard;

identifying a cooking temperature difference according to the present cooking temperature and the cooking temperature standard;

identifying a standard adjustment factor according to the ingredient parameter difference and the cooking temperature difference based on a preset cooking control algorithm;

adjusting the ingredient parameter standard and the cooking temperature standard according to the standard adjustment factor to acquire a present ingredient parameter standard and a present cooking temperature standard; and generating a first cooking control parameter of the intelligent cooking device according to the present ingredient parameter standard, the present cooking temperature standard and the present cooking gear.

As an optional embodiment, in the second aspect of the present application, the apparatus also includes:

a first determining module, used for, before the generating module generates a first cooking control parameter of the intelligent cooking device according to the present ingredient parameter, the present cooking temperature and the present cooking gear, determining whether the target ingredient meets a preset cooking condition; when it is determined that the target ingredient meets the preset cooking condition, triggering the generating module to perform an operation of generating a first cooking control parameter of the intelligent cooking device according to the present ingredient parameter, the present cooking temperature and the present cooking gear;

steps of the first determining module determining whether the target ingredient meets a preset cooking condition specifically include:

identifying a doneness weight range corresponding to the target ingredient based on a range-identifying factor, the range-identifying factor including a combination of one or more of an actual cooking process, actual cooking duration, original ingredient weight of the target ingredient and a cooking objective corresponding to the target ingredient, the actual cooking process including cooking steps actually performed from a beginning of a cooking operation to a current moment in time;

collecting a real-time ingredient weight of the target ingredient;

determining whether the real-time ingredient weight falls within the doneness weight range; and identifying that the target ingredient meets the preset cooking condition when it is determined that the real-time ingredient weight does not fall within the doneness weight range.

As an optional embodiment, in the second aspect of the present application, the apparatus also includes:

a second identifying module, used for, before the generating module generates a first cooking control parameter of the intelligent cooking device according to the present ingredient parameter, the present cooking temperature and the present cooking gear, identifying a pending adjusting cooking device according to the present cooking temperature and the present cooking gear, the pending adjusting cooking device being the intelligent cookware and/or the intelligent stove;

a first cooking control parameter of the intelligent cooking device includes at least a first cooking control parameter of the pending adjusting cooking device;

when the pending adjusting cooking device includes the intelligent stove and the intelligent stove is a gas stove, a first stove control parameter of the intelligent stove includes a combination of one or more of a flame distribution position, a flame density, a flame temperature, a flame jet strength, a flame blast direction and a flame blast duration; and when the pending adjusting cooking device includes the intelligent stove and the intelligent stove is an induction stove, a first stove control parameter of the intelligent stove includes a combination of one or more of an induction stove power, a power duration and a heating position.

As an optional embodiment, in the second aspect of the present application, the apparatus also includes:

a second collecting module, used for, after the controlling module controls the intelligent cooking device to cook the target ingredient according to the first cooking control parameter of the intelligent cooking device, collecting a real-time ingredient color of the target ingredient and a real-time softness degree of the target ingredient;

a third identifying module, used for identifying a real-time doneness degree of the target ingredient according to the real-time ingredient color and the real-time softness degree;

a second determining module, used for determining whether the real-time doneness degree meets a preset doneness degree requirement;

the generating module is also used for, when the second determining module determines that the real-time doneness degree does not meet the doneness degree requirement, generating a second cooking control parameter of the intelligent cooking device according to the real-time doneness degree and the doneness degree requirement; and the controlling module is also used for controlling the intelligent cooking device to cook the target ingredient according to the second cooking control parameter of the intelligent cooking device so that the doneness degree of the target ingredient meets the preset doneness degree requirement.

Disclosed in a third aspect of the present application is an apparatus for automatic cooking control based on an intelligent cooking device, the method including:

a memory, memorized with an executable code; and a processor, coupled with the memory, the processor invokes the executable code memorized in the memory to perform the method for automatic cooking control based on an intelligent cooking device disclosed in the first aspect of the present application.

Disclosed as a fourth aspect in the present application is a non-transitory computer memory medium, and the non-transitory computer memory medium memorizes computer instructions; when the computer instructions are invoked, the method for automatic cooking control based on an intelligent cooking device disclosed in the first aspect of the present application is performed.

Compared to the prior art, the embodiments of the present application have beneficial effects as follows.

In the embodiments of the present application, the method is applied to an intelligent cooking device, the intelligent cooking device including an intelligent cookware and an intelligent stove, the method including: collecting a present ingredient parameter of a target ingredient in the intelligent cookware and a present cooking temperature of the intelligent cookware, the present ingredient parameter including at least an ingredient identification; acquiring a present cooking gear of the intelligent stove; generating a first cooking control parameter of the intelligent cooking device according to the present ingredient parameter, the present cooking temperature and the present cooking gear, the first cooking control parameter of the intelligent cooking device including at least a first stove control parameter of the intelligent stove and/or a first cookware control parameter of the intelligent cookware; and controlling the intelligent cooking device to cook the target ingredient according to the first cooking control parameter of the intelligent cooking device. It is evident that, by performing the present application, a first cooking control parameter of the intelligent cooking device may be generated according to the collected present ingredient parameter of the target ingredient in the intelligent cookware, the present cooking temperature of the intelligent cookware and the acquired present cooking gear of the intelligent stove; and the intelligent control of the cooking process may be achieved based on the intelligent cooking device based on the first cooking control parameter to control the intelligent cooking device to cook the target ingredient, which improves the efficiency and accuracy of generating the cooking control parameter, which improves the accuracy of the cooking control parameter, which is beneficial to improve the accuracy of the cooking control to improve the cooking precision, which is beneficial to improve the user's cooking experience, thereby improving the user reliance on the intelligent cooking device.

BRIEF DESCRIPTION OF THE DRAWINGS

In order to illustrate the technical solutions of the embodiments of the present application more clearly, the following drawings are briefly described as required in the context of the embodiments. Obviously, the following drawings only illustrate only some of the embodiments of the present application. Other relevant drawings may be obtained on the basis of these drawings without any creative effort by those skilled in the art.

DETAILED DESCRIPTION OF THE PREFERRED EMBODIMENTS

Figure 1:
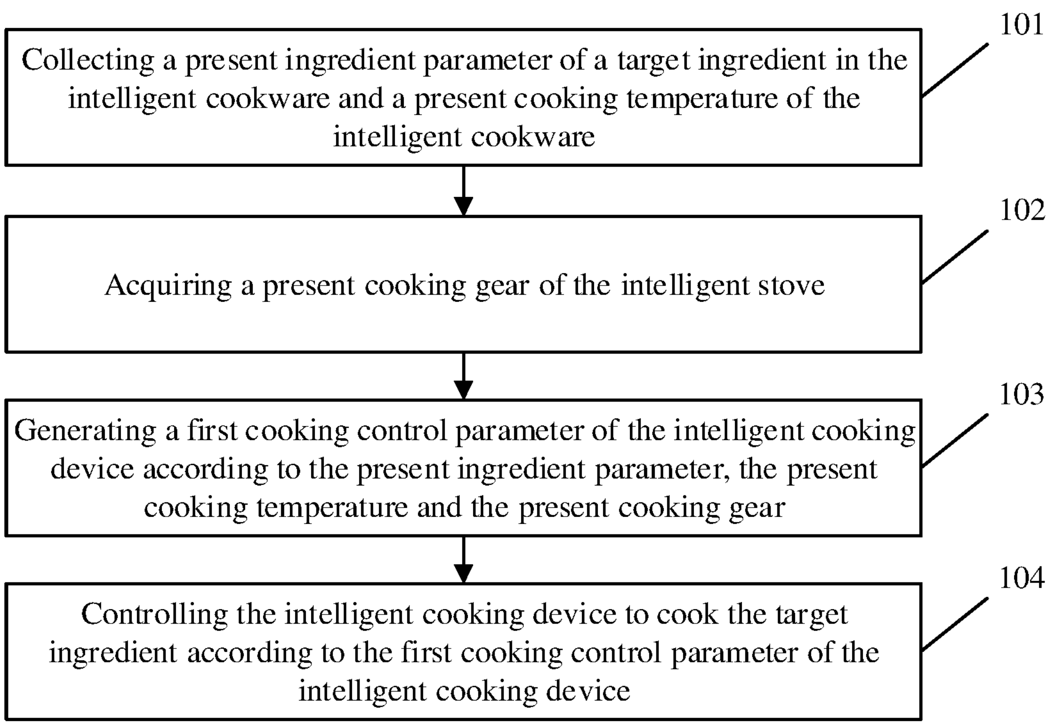
FIG. 1 is a flow diagram of a method for automatic cooking control based on an intelligent cooking device disclosed in an embodiment of the present application.

For a better understanding of the solutions of the present application by those skilled in the art, the technical solutions in the embodiments of the present application are clearly and completely described and discussed below in conjunction with the attached drawings of the present embodiments of the application. Obviously, the embodiments described herein are only some of the embodiments of the present application but not all of them. Based on the embodiments in the present application, all other embodiments acquired by those skilled in the art without inventive effort fall within the scope of protection of the present application.

The terms "first", "second", and the like in the specification, the claims and the above-mentioned drawings of the present application are used to identify different objects and are not intended to describe a particular sequence. In addition, the terms "comprise" and "include", and any derivatives and conjugations thereof, are intended to cover nonexclusive inclusion. For example, a process, method, apparatus, product, or device that comprises a series of steps or units is not limited to the listed steps or units, but optionally also comprises steps or units that are not listed, or optionally also comprises other steps or units that are inherent to those processes, methods, products, or devices.

The term “embodiment” herein means that a particular feature, structure or characteristic described in conjunction with an embodiment may be comprised in at least one embodiment of the present application. The presence of the term in various places in the specification does not necessarily indicate the same embodiment, nor is it a separate or alternative embodiment that is mutually exclusive with other embodiments. It is understood, both explicitly and implicitly, by those skilled in the art that the embodiments described herein may be combined with other embodiments.

Disclosed in the present application is a method and an apparatus for automatic cooking control based on an intelligent cooking device, in which a first cooking control parameter of the intelligent cooking device may be generated according to the collected present ingredient parameter of the target ingredient in the intelligent cookware, the present cooking temperature of the intelligent cookware and the acquired present cooking gear of the intelligent stove; and the intelligent control of the cooking process may be achieved based on the intelligent cooking device based on the first cooking control parameter to control the intelligent cooking device to cook the target ingredient, which improves the efficiency and accuracy of generating the cooking control parameter, which improves the accuracy of the cooking control parameter, which is beneficial to improve the accuracy of the cooking control to improve the cooking accuracy, which is beneficial to improve the user’s cooking experience, thereby improving the user stickiness with the intelligent cooking device. Detailed descriptions are provided respectively as follows.

Embodiment 1

Referring to FIG. 1. FIG. 1 is a flow diagram of a first method for automatic cooking control based on an intelligent cooking device disclosed in the present embodiment of the application. The method for automatic cooking control based on an intelligent cooking device described in FIG. 1 may be applied to an intelligent cooking device, the intelligent cooking device including an intelligent cookware and an intelligent stove. The method may also be applied to a device, a terminal, a system, or a server that controls an intelligent cooking device to perform cooking, wherein the server includes a local server or a cloud server, which is not limited in the present embodiment of the application. As shown in FIG. 1, the method for automatic cooking control based on an intelligent cooking device may include operations as follows:

At step 101, collecting a present ingredient parameter of a target ingredient in the intelligent cookware and a present cooking temperature of the intelligent cookware.

In the present embodiment of the application, the target ingredient may include one or more ingredients, which is not limited in the present embodiment of the application. The present ingredient parameter may include at least an ingredient identification, wherein the ingredient identification may be the name of the target ingredient, such as tomato, pork, chicken egg and rice, or may be the type of the target ingredient, such as vegetable, meat, egg and staple food, or may be the number or code of the target ingredient, which is not limited in the present embodiment of the application.

Additionally, the present cooking temperature of the intelligent cookware may be collected by a thermal element, such as a temperature sensor and a thermometer; the present cooking temperature of the intelligent cookware may be collected based on infrared signal acquisition technology. Further, the present cooking temperature of the intelligent cookware may be collected based on an intelligent cookware handle integrated with a thermal element, wherein the intelligent cookware handle may be an intelligent cookware handle corresponding to the intelligent cookware, which is not limited in the present embodiment of the application.

At step 102, acquiring a present cooking gear of the intelligent stove.

In the present embodiment of the application, the present cooking gear of the intelligent stove may be a preset flame level range or a preset power level range of the intelligent stove, such as low, medium, and high flame; further, the present cooking gear may be set by the user corresponding to the intelligent stove, or may be preset by the intelligent cooking device, or may be identified by the intelligent cooking device based on the cooking flow, which is not limited in the present embodiment of the application. The present cooking gear of the intelligent stove may be a preset cooking mode corresponding to the intelligent stove, and further, the cooking mode may be a mode for cooking a particular cuisine, such as pan-fried steak. The cooking mode may also be a mode with a combination of one or more auxiliary cooking manners, such as stewing and frying, which is not limited in the present embodiment of the application.

It is to be noted that there is no sequential relationship between step 101 and step 102. i.e., step 101 may occur before or after step 102 or at the same time as step 102, which is not limited in the present embodiment of the application.

At step 103, generating a first cooking control parameter of the intelligent cooking device according to the present ingredient parameter, the present cooking temperature and the present cooking gear.

In the present embodiment of the application, the first cooking control parameter of the intelligent cooking device may include at least a first stove control parameter of the intelligent stove and/or a first cookware control parameter of the intelligent cookware.

At step 104, controlling the intelligent cooking device to cook the target ingredient according to the first cooking control parameter of the intelligent cooking device.

It is evident that, by performing the method described in the present embodiment of the application, a first cooking control parameter of the intelligent cooking device may be generated according to the collected present ingredient parameter of the target ingredient in the intelligent cookware, the present cooking temperature of the intelligent cookware and the acquired present cooking gear of the intelligent stove; and the intelligent control of the cooking process may be achieved based on the intelligent cooking device based on the first cooking control parameter to control the intelligent cooking device to cook the target ingredient, which improves the efficiency and accuracy of generating the cooking control parameter, which improves the accuracy of the cooking control parameter, which is beneficial to improve the accuracy of the cooking control to improve the cooking precision, which is beneficial to improve the user’s cooking experience, thereby improving the user reliance on the intelligent cooking device.

In an optional embodiment, collecting a present ingredient parameter of a target ingredient may include operations as follows:

collecting an ingredient identification of the target ingredient in the intelligent cookware;

identifying a first ingredient parameter type corresponding to the ingredient identification according to the ingredient identification, the first ingredient parameter type including at least one ingredient parameter type corresponding to the ingredient identification selected from all ingredient parameter types; and collecting the present ingredient parameter of the target ingredient according to the first ingredient parameter type.

The ingredient identification of the target ingredient may be input by the user corresponding to the intelligent cooking device, may be recognized by image recognition technology, or may be acquired by analyzing the target ingredient and looking up from the ingredient database, which is not limited in the present embodiment of the application.

The ingredient parameter type may include a combination of one or more of an ingredient weight type, an ingredient amount type, an ingredient shape type, an ingredient volume type, an ingredient humidity type, an ingredient color type and a degree type of softness or hardness.

It is evident that, in this optional embodiment, a first ingredient parameter type corresponding to the ingredient identification is identified according to the ingredient identification, and the present ingredient parameter is collected according to the first ingredient parameter type, which may identify the corresponding ingredient parameter type according to the specific ingredient, which improves the identified accuracy of the present ingredient parameter, which improves the efficiency and accuracy of collecting the present ingredient parameter, which is beneficial to improve the accuracy of generating the cooking control parameter.

In this optional embodiment, before collecting the present ingredient parameter of the target ingredient according to the first ingredient parameter type, the method may also include operations as follows:

identifying an eating preference corresponding to the ingredient identification according to the ingredient identification, the eating preference being used for indicating an eating preference of a diner with respect to the ingredient identification corresponding to the target ingredient;

collecting the present ingredient parameter of the target ingredient according to the first ingredient parameter type may include:

collecting a first ingredient parameter corresponding to the first ingredient parameter type according to the first ingredient parameter type;

identifying a second ingredient parameter type corresponding to the ingredient identification according to the eating preference and the first ingredient parameter type; and collecting a second ingredient parameter corresponding to the second ingredient parameter type according to the second ingredient parameter type.

The eating preference may include a combination of one or more preference of diners with respect to ingredients corresponding to the ingredient identification, such as smell preference, taste preference, doneness preference and degree of softness preference. The second ingredient parameter type may include at least one ingredient parameter type corresponding to the ingredient identification selected from all ingredient parameter types.

The present ingredient parameter of the target ingredient is identified according to the first ingredient parameter and the second ingredient parameter, the present ingredient parameter also including a combination of one or more of a present ingredient weight, a present ingredient amount, a present ingredient shape, a present ingredient volume, a present ingredient humidity, a present ingredient color and a present degree of softness or hardness. When the present ingredient parameter includes the present ingredient weight, the present ingredient weight may be collected based on a weight-detecting element corresponding to the intelligent cooking device, wherein the weight-detecting element may be the weight-detecting element corresponding to the intelligent cookware or the intelligent stove, which is not limited in the present embodiment of the application.

Further, the present ingredient parameter of the target ingredient may be an intersection between the first ingredient parameter and the second ingredient parameter. Specifically, if there is an overlapping ingredient parameter between the first ingredient parameter and the second ingredient parameter, the overlapping ingredient parameter is indicated to be of high importance, and the overlapping ingredient parameter is identified as the present ingredient parameter, which may improve the accuracy of the collected present ingredient parameter, which is beneficial to improve the efficiency of generating the first cooking control parameter. The present ingredient parameter may also be a union between the first ingredient parameter and the second ingredient parameter, which may improve the comprehensiveness of the collected present ingredient parameter, which is beneficial to improve the accuracy of generating the first cooking control parameter, which is not limited in the present embodiment of the application.

It is evident that, in this optional embodiment, the corresponding eating preference may be identified according to the ingredient identification; the second ingredient parameter type may be identified according to the eating preference and the first ingredient parameter type; and the present ingredient parameter may be identified according to the collected ingredient parameter, in which the accuracy of identifying the ingredient parameter type may be improved, which may improve the accuracy and efficiency of the ingredient parameter corresponding to the collected ingredient parameter type, which may improve the cooking precision, which is beneficial to improve the compatibility between the cooked cuisine and the preference of the diner.

In this optional embodiment, identifying the eating preference corresponding to the ingredient identification according to the ingredient identification may include operations as follows:

looking up from the database where the eating preferences of diners are recorded to acquire the eating preference corresponding to the ingredient identification according to the ingredient identification; or identifying the eating preference corresponding to the ingredient identification according to the ingredient identification and information of the diner.

The information about the diner may include a combination of one or more of the age of the diner, region of the diner, health condition of the diner and eating habits of the diner.

Exemplarily, older seniors have poor teeth, so seniors' eating preferences may be softer foods; people from different regions may have different tastes. For example, the eating preference of people in Sichuan and Chongqing may be spicy food, that of people in Jiangsu and Zhejiang may be sweet food, and that of people who are sick may be light-flavored food. If the target ingredient is steak, due to different dietary habits, some people prefer steak medium well, while others prefer steak medium rare.

It is evident that, in this optional embodiment, the eating preference may be looked up from the database according to the ingredient identification, or the eating preference may be identified according to the ingredient identification and the information of the diner, which may improve the accuracy of the eating preference, which may improve the accuracy of collecting ingredient parameter, which is beneficial to improve the compatibility between the cooked cuisine and the preference of the diner.

In an optional embodiment, before generating a first cooking control parameter of the intelligent cooking device according to the present ingredient parameter, the present cooking temperature and the present cooking gear, the method may also include operations as follows:

determining whether the target ingredient meets a preset cooking condition;

when it is determined that the target ingredient meets the preset cooking condition, triggering to perform an operation of generating a first cooking control parameter of the intelligent cooking device according to the present ingredient parameter, the present cooking temperature and the present cooking gear;

determining whether the target ingredient meets a preset cooking condition may include operations as follows:

identifying a doneness weight range corresponding to the target ingredient based on a range-identifying factor, the range-identifying factor including a combination of one or more of an actual cooking process, actual cooking duration, original ingredient weight of the target ingredient and a cooking objective corresponding to the target ingredient, the actual cooking process including cooking steps actually performed from a beginning of a cooking operation to a current moment in time;

collecting a real-time ingredient weight of the target ingredient;

determining whether the real-time ingredient weight falls within the doneness weight range; and identifying that the target ingredient meets the preset cooking condition when it is determined that the real-time ingredient weight does not fall within the doneness weight range.

The cooking objective corresponding to that target ingredient may include a doneness objective of the target ingredient and/or a cooking duration objective of the target ingredient.

Exemplarily, supposing that the target ingredient is steak; the range-identifying factor may include an actual cooking duration (2 min), an original ingredient weight (230 g) and a cooking objective (doneness objective is medium well and cooking duration objective is 3 min.). The doneness weight range of the steak is identified as 180 g to 190 g, while the collected real-time ingredient weight of the steak is 210 g, so the real-time ingredient weight of the steak does not fall within the doneness weight range, i.e., the target ingredient meets the preset cooking condition, and the operation of generating the first cooking control parameter may be continued to perform.

Optionally, determining whether the target ingredient meets a preset cooking condition may also include operations as follows:

identifying that the target ingredient does not meet the preset cooking condition when it is determined that the real-time ingredient weight falls within the doneness weight range.

It is evident that, in this optional embodiment, the operation of generating a first cooking control parameter of the intelligent cooking device according to the present ingredient parameter is only performed when it is determined that the target ingredient meets the preset cooking condition; the doneness weight range corresponding to the target ingredient is determined based on the range-identifying factor, and if the real-time ingredient weight of the target ingredient does not fall within the doneness weight range, then the target ingredient meets the preset cooking condition; or else the target ingredient does not meet the preset cooking condition, which may improve the accuracy of performing the operation of generating the cooking control parameter, which is beneficial to improve the efficiency and accuracy of cooking control.

In this optional embodiment, the method may also include operations as follows:

analyzing a cooking interruption reason corresponding to the target ingredients not meeting the preset cooking condition when it is determined that the target ingredient does not meet the preset cooking condition;

ending a cooking flow when the cooking interruption reason is used for indicating that the target ingredient has finished cooking;

identifying a remedial operation corresponding to the cooking interruption reason when the cooking interruption reason is used for indicating that the ingredient parameter of the target ingredient does not meet the standards, and sending a remedial operation reminder to the user to remind the user to perform the remedial operation; and re-performing an operation of determining whether the target ingredient meets a preset cooking condition after detecting that the user has performed the aforementioned remedial operation.

The user may be a diner or maybe an operator who operates the intelligent cooking device to cook, which is not limited in the present embodiment of the application.

Exemplarily, the ingredient parameter of the target ingredient does not meet the standards may be insufficient weight of the target ingredient or low humidity of the target ingredient; correspondingly, the remedial operation may be to add ingredients to the intelligent cookware with the same ingredient identification as the target ingredient or add water to the intelligent cookware.

It is evident that, in this optional embodiment, a cooking interruption reason that does not meet the conditions may also be analyzed when it is determined that the target ingredient does not meet the preset cooking condition; the cooking process may end when the cooking interruption reason is that the target ingredient has finished cooking; the user may be reminded to perform a remedial operation when the cooking interruption reason is that the target ingredient does not meet the standards; and re-performing an operation of determining whether the target ingredient meets a preset cooking condition after detecting that the user has performed the aforementioned remedial operation, which may improve the accuracy of identifying the cooking interruption reason, which may improve the identified accuracy of performing the cooking operation, which is beneficial to improve the cooking efficiency.

Embodiment 2

Figure 2:
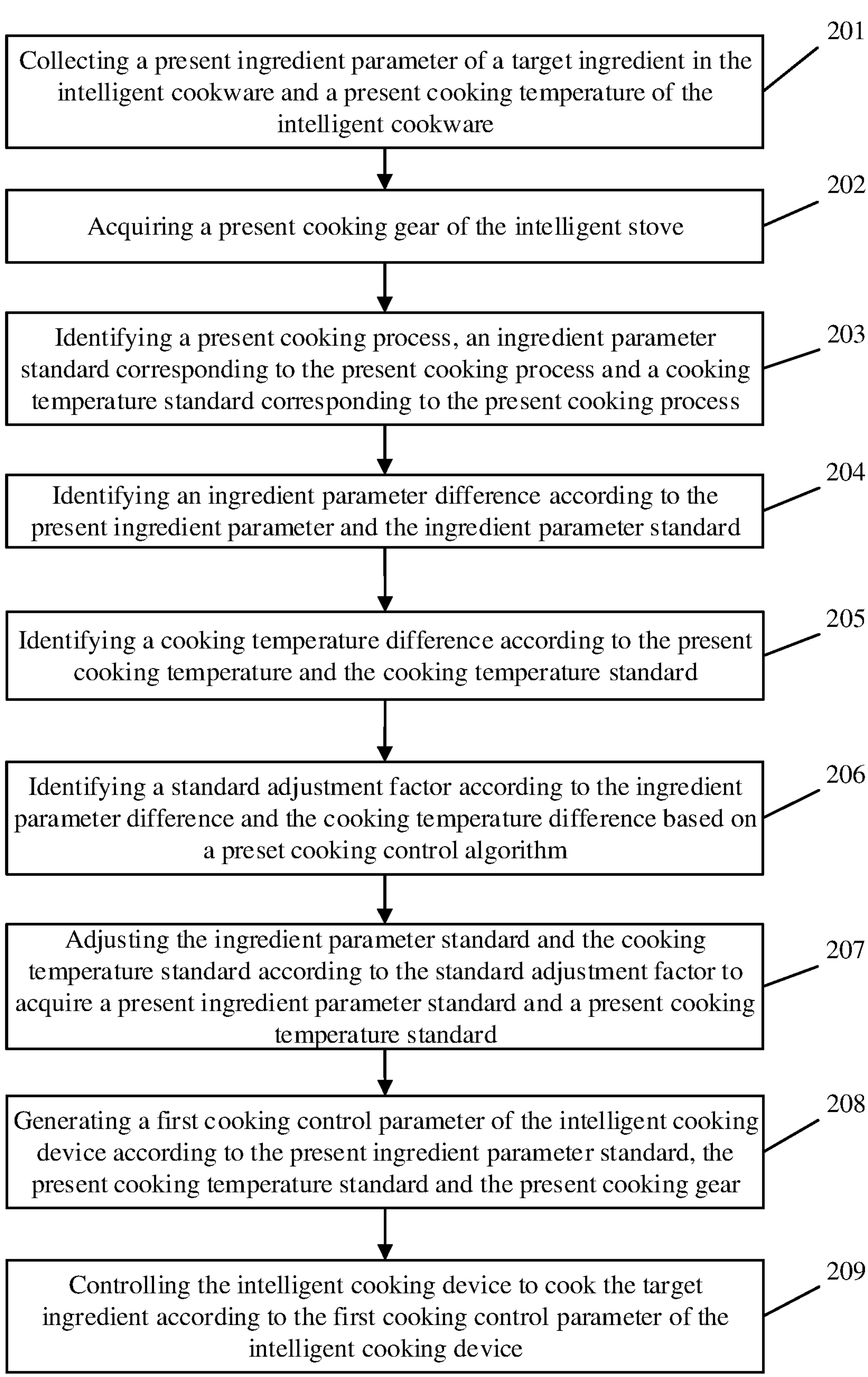
FIG. 2 is a flow diagram of another method for automatic cooking control based on an intelligent cooking device disclosed in an embodiment of the present application.

Referring to FIG. 2, FIG. 2 is a flow diagram of a second method for automatic cooking control based on an intelligent cooking device disclosed in the present embodiment of the application. The method for automatic cooking control based on an intelligent cooking device described in FIG. 2 may be applied to an intelligent cooking device, the intelligent cooking device including an intelligent cookware and an intelligent stove. The method may also be applied to a device, a terminal, a system, or a server that controls an intelligent cooking device to perform cooking, wherein the server includes a local server or a cloud server, which is not limited in the present embodiment of the application. As shown in FIG. 2, the method for automatic cooking control based on an intelligent cooking device may include operations as follows:

At step 201, collecting a present ingredient parameter of a target ingredient in the intelligent cookware and a present cooking temperature of the intelligent cookware.

At step 202, acquiring a present cooking gear of the intelligent stove.

At step 203, identifying a present cooking process, an ingredient parameter standard corresponding to the present cooking process and a cooking temperature standard corresponding to the present cooking process.

In the present embodiment of the application, the present cooking process is one of the cooking processes of a cooking flow corresponding to the target ingredient, the cooking process including at least one cooking step. The present cooking process may be identified according to the present cooking duration and the preset cooking process duration, or the present cooking process may be identified according to actual cooking records of all cooking processes. Further, the cooking steps of the present cooking process may be identified according to the preset ingredient identification corresponding to each cooking process and the present ingredient parameter of the target ingredient. For example, supposing that only tomatoes are included in step one of the present cooking processes, while tomatoes and brisket are included in step two, whereas the ingredient identification of the target ingredient includes only tomatoes, then it may be determined that the present cooking step is step one of the present cooking process, which is not limited in the present embodiment of the application. The type of the ingredient parameter standard corresponds to the type of the present ingredient parameter; the ingredient parameter standard and the cooking temperature standard may be a specific value, or an interval of values, which is not limited in the present embodiment of the application.

At step 204, identifying an ingredient parameter difference according to the present ingredient parameter and the ingredient parameter standard.

At step 205, identifying a cooking temperature difference according to the present cooking temperature and the cooking temperature standard.

At step 206, identifying a standard adjustment factor according to the ingredient parameter difference and the cooking temperature difference based on a preset cooking control algorithm.

In the present embodiment of the application, the cooking control algorithm may be an algorithm for closed-loop control, and further, it may be a PID algorithm and PID algorithm-derived algorithms (e.g., the ADRC algorithm), or control algorithms adapted on the basis of PID algorithms and PID algorithm-derived algorithms, which is not limited in the present embodiment of the application.

At step 207, adjusting the ingredient parameter standard and the cooking temperature standard according to the standard adjustment factor to acquire a present ingredient parameter standard and a present cooking temperature standard.

At step 208, generating a first cooking control parameter of the intelligent cooking device according to the present ingredient parameter standard, the present cooking temperature standard and the present cooking gear.

At step 209, controlling the intelligent cooking device to cook the target ingredient according to the first cooking control parameter of the intelligent cooking device.

In the present embodiment of the application, regarding other detailed descriptions of step 201 to step 202 and step 209, please refer to the other detailed descriptions in embodiment 1 regarding step 101 to step 102 and step 104, which is not repeated in the present embodiment of the application.

It is evident that, by performing the method described in the present embodiment of the application, a first cooking control parameter of the intelligent cooking device may be generated according to the collected present ingredient parameter of the target ingredient in the intelligent cookware, the present cooking temperature of the intelligent cookware and the acquired present cooking gear of the intelligent stove; and the intelligent control of the cooking process may be achieved based on the intelligent cooking device based on the first cooking control parameter to control the intelligent cooking device to cook the target ingredient, which improves the efficiency and accuracy of generating the cooking control parameter, which improves the accuracy of the cooking control parameter, which is beneficial to improve the accuracy of the cooking control to improve the cooking accuracy, which is beneficial to improve the user's cooking experience, thereby improving the user stickiness with the intelligent cooking device. Additionally, before generating the first cooking control parameter, the ingredient parameter standard corresponding to the present cooking process and the cooking temperature standard corresponding to the present cooking process may be identified, and the ingredient parameter difference and the cooking temperature difference may be identified; the present ingredient parameter standard and the present cooking temperature standard are acquired by adjusting according to the standard adjustment factor identified based on the cooking control algorithm; the first cooking control parameter is generated according to the present ingredient parameter standard, the present cooking temperature standard and the present cooking gear, which may achieve that the temperature standard and the ingredient standard are adaptively adjusted according to the actual cooking situation, which may improve the accuracy of adjusting the ingredient parameter standard and the cooking temperature standard, which may improve the accuracy of identifying the cooking control parameter, which is beneficial to improve the efficiency and accuracy of the cooking control.

In an optional embodiment, before generating a first cooking control parameter of the intelligent cooking device according to the present ingredient parameter, the present cooking temperature and the present cooking gear, the method may also include operations as follows:

identifying a pending adjusting cooking device according to the present cooking temperature and the present cooking gear, the pending adjusting cooking device being the intelligent cookware and/or the intelligent stove;

a first cooking control parameter of the intelligent cooking device includes at least a first cooking control parameter of the pending adjusting cooking device;

when the pending adjusting cooking device includes the intelligent stove and the intelligent stove is a gas stove, a first stove control parameter of the intelligent stove includes a combination of one or more of a flame distribution position, a flame density, a flame temperature, a flame jet strength, a flame blast direction and a flame blast duration; and when the pending adjusting cooking device includes the intelligent stove and the intelligent stove is an induction stove, a first stove control parameter of the intelligent stove includes a combination of one or more of an induction stove power, a power duration and a heating position.

The pending adjusting cooking device is used for indicating an intelligent cooking device requiring to generate or adjust corresponding cooking control parameter.

Optionally, identifying a pending adjusting cooking device according to the present cooking temperature and the present cooking gear may include operations as follows:

identifying a present cooking step of the present cooking process, and the cooking temperature standard corresponding to the present cooking step and the cooking gear standard corresponding to the present cooking step;

determining whether the present cooking temperature reaches the cooking temperature standard;

identifying that the pending adjusting cooking device includes an intelligent cookware and an intelligent stove when it is determined that the present cooking temperature does not reach the cooking temperature standard; and/or, determining whether the present cooking gear reaches the cooking gear standard;

identifying that the pending adjusting cooking device includes at least an intelligent stove when it is determined that the present cooking gear does not reach the cooking gear standard.

It is evident that, in this optional embodiment, the pending adjusting cooking device may be identified according to the present cooking temperature and the present cooking gear, and the stove control parameter of the intelligent stove may be specifically identified according to the intelligent stove type, which may improve the accuracy of identifying the pending adjusting cooking device, which may improve the accuracy of identifying the cooking control parameter to be generated, thereby improving the generating efficiency of the cooking control parameter.

In an optional embodiment, after controlling the intelligent cooking device to cook the target ingredient according to the first cooking control parameter of the intelligent cooking device, the method may also include operations as follows:

collecting a real-time ingredient color of the target ingredient and a real-time softness degree of the target ingredient;

identifying a real-time doneness degree of the target ingredient according to the real-time ingredient color and the real-time softness degree;

determining whether the real-time doneness degree meets a preset doneness degree requirement;

when it is determined that the real-time doneness degree does not meet the doneness degree requirement, generating a second cooking control parameter of the intelligent cooking device according to the real-time doneness degree and the doneness degree requirement;

controlling the intelligent cooking device to cook the target ingredient according to the second cooking control parameter of the intelligent cooking device so that the doneness degree of the target ingredient meets the preset doneness degree requirement.

The second cooking control parameter of the intelligent cooking device may include at least a second stove control parameter of the intelligent stove and/or a second cookware control parameter of the intelligent cookware.

Exemplarily, according to practice, the surface of a rare steak is brown; the surface of a medium-rare steak begins to turn grayish brown and increases in firmness; the surface of a medium steak increases in grayish brown area and becomes dry and tough; the surface of a medium-well steak turns mostly grayish brown and hardens further; and the surface of a well-done steak turns completely grayish brown and the meat becomes tougher. Supposing that the target ingredient is a steak, the collected real-time ingredient color is brown; the real-time softness degree indicates that the ingredient is relatively soft; the real-time doneness degree of the steak is determined to be rare, but the doneness degree is required to be cooked to be medium. Thus, it may be determined that the real-time doneness degree does not meet the doneness degree requirement, so it is necessary to generate a second cooking control parameter, and the cooking will continue according to the second cooking control parameter.

It is evident that, in this optional embodiment, after performing the cooking operations according to the first cooking control parameter, the real-time doneness degree of the target ingredient is identified according to the collected real-time ingredient color and real-time doneness degree of the target ingredient; the second cooking control parameter of the intelligent cooking device is generated according to the real-time doneness degree and the doneness degree requirement when it is determined that the real-time doneness degree does not meet the doneness degree requirement; and the cooking operations is performed continuously according to the second cooking control parameter, which may improve the accuracy of identifying the cooking control process, which may improve the accuracy of identifying the second cooking control parameter, which is beneficial to improve the accuracy of the cooking control.

In this optional embodiment, generating a second cooking control parameter of the intelligent cooking device according to the real-time doneness degree and the doneness degree requirement may include operations as follows:

determining whether the target ingredient needs to be stirred according to the real-time doneness degree and the doneness degree requirement;

generating a second cookware control parameter of the intelligent cookware according to the real-time doneness degree and the doneness degree requirement when it is determined that the target ingredient needs to be stirred;

the second cookware control parameter of the intelligent cookware may include at least a stirring parameter, the stirring parameter including a combination of one or more of stirring direction, stirring speed, stirring frequency and stirring duration; the second cookware control parameter of the intelligent cookware may also include a cookware-shaking parameter, the cookware-shaking parameter including a combination of one or more of cookware-shaking strength, cookware-shaking direction, cookware-shaking frequency and cookware-shaking duration, which is not limited in the present embodiment of the application.

It is to be noted that, in the present embodiment of the application, the stirring parameter is used for indicating the intelligent cookware to perform an operation of stirring to the target ingredient, in which the operation of stirring may be performed by a manipulator or a stirrer corresponding to the intelligent cookware. Further, the operation of stirring may be either a tossing of the target ingredient, a flipping of the target ingredient or a mixing of the target ingredient, which is not limited in the present embodiment of the application.

It is evident that, in this optional embodiment, when it is determined that the target ingredient needs to be stirred according to the real-time doneness degree and the doneness degree requirement, the second cookware control parameter of the intelligent cookware is generated, which may improve the efficiency and accuracy of identifying the second cookware control parameter, which may improve the accuracy of the cooking control, which is beneficial to improve the cooking accuracy.

Embodiment 3

Figure 3:
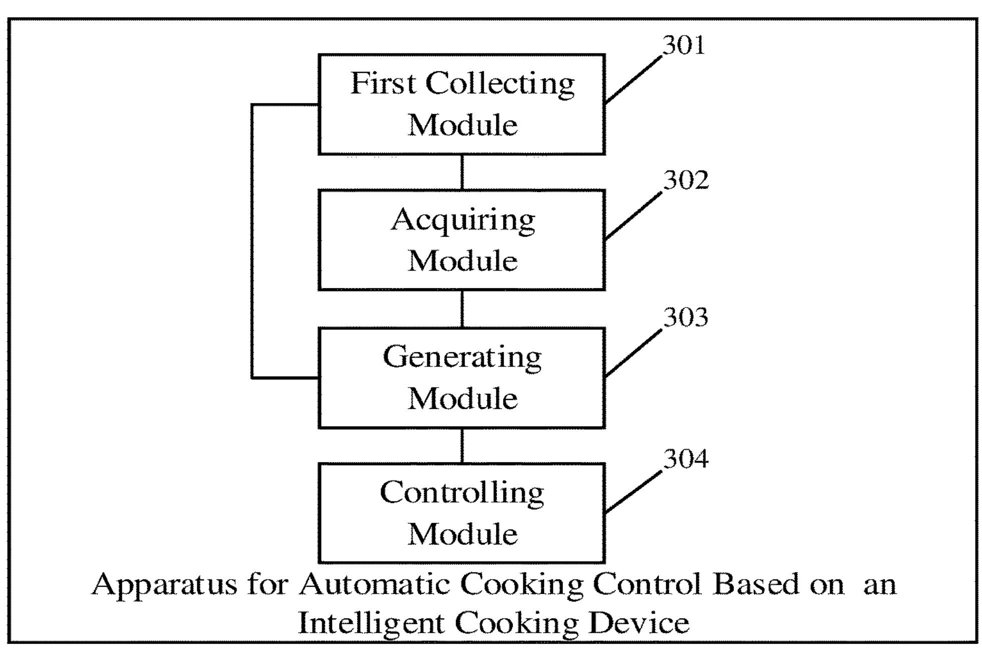
FIG. 3 is a structural diagram of an apparatus for automatic cooking control based on an intelligent cooking device disclosed in an embodiment of the present application.

Referring to FIG. 3, FIG. 3 is a structural diagram of a first apparatus for automatic cooking control based on an intelligent cooking device disclosed in the present embodiment of the application. The apparatus for automatic cooking control based on an intelligent cooking device described in FIG. 3 may be applied to an intelligent cooking device, the intelligent cooking device including an intelligent cookware and an intelligent stove. The apparatus may also be applied to a device, a terminal, a system, or a server that controls an intelligent cooking device to perform cooking, wherein the server includes a local server or a cloud server, which is not limited in the present embodiment of the application. As shown in FIG. 3, the apparatus for automatic cooking control based on an intelligent cooking device may include:

a first collecting module 301, used for collecting a present ingredient parameter of a target ingredient in the intelligent cookware and a present cooking temperature of the intelligent cookware, the present ingredient parameter including at least an ingredient identification;

an acquiring module 302, used for acquiring a present cooking gear of the intelligent stove;

a generating module 303, used for generating a first cooking control parameter of the intelligent cooking device according to the present ingredient parameter, the present cooking temperature and the present cooking gear, the first cooking control parameter of the intelligent cooking device including at least a first stove control parameter of the intelligent stove and/or a first cookware control parameter of the intelligent cookware; and a controlling module 304, used for controlling the intelligent cooking device to cook the target ingredient according to the first cooking control parameter of the intelligent cooking device.

It is evident that, by performing the apparatus described in the present embodiment of the application, a first cooking control parameter of the intelligent cooking device may be generated according to the collected present ingredient parameter of the target ingredient in the intelligent cookware, the present cooking temperature of the intelligent cookware and the acquired present cooking gear of the intelligent stove; and the intelligent control of the cooking process may be achieved based on the intelligent cooking device based on the first cooking control parameter to control the intelligent cooking device to cook the target ingredient, which improves the efficiency and accuracy of generating the cooking control parameter, which improves the accuracy of the cooking control parameter, which is beneficial to improve the accuracy of the cooking control to improve the cooking accuracy, which is beneficial to improve the user's cooking experience, thereby improving the user reliance on the intelligent cooking device.

In an optional embodiment, the first collecting module 301 may include:

a collecting sub-module 3011, used for collecting an ingredient identification of the target ingredient in the intelligent cookware;

an identifying sub-module 3012, used for identifying a first ingredient parameter type corresponding to the ingredient identification according to the ingredient identification, the first ingredient parameter type including at least one ingredient parameter type corresponding to the ingredient identification selected from all ingredient parameter types; and the collecting sub-module 3011 is also used for collecting the present ingredient parameter of the target ingredient according to the first ingredient parameter type.

It is evident that, by performing the apparatus described in the present embodiment of the application, a first ingredient parameter type corresponding to the ingredient identification is identified according to the ingredient identification, and the present ingredient parameter is collected according to the first ingredient parameter type, which may identify the corresponding ingredient parameter type according to the specific ingredient, which improves the identified accuracy of the present ingredient parameter, which improves the efficiency and accuracy of collecting the present ingredient parameter, which is beneficial to improve the accuracy of generating the cooking control parameter.

In this optional embodiment, the identifying sub-module 3012 is also used for, before the collecting sub-module 3011 collects the present ingredient parameter of the target ingredient according to the first ingredient parameter type, identifying an eating preference corresponding to the ingredient identification according to the ingredient identification, the eating preference being used for indicating an eating preference of a diner with respect to the ingredient identification corresponding to the target ingredient;

the steps of the collecting sub-module 3011 collecting the present ingredient parameter of the target ingredient according to the first ingredient parameter type may include:

collecting a first ingredient parameter corresponding to the first ingredient parameter type according to the first ingredient parameter type;

identifying a second ingredient parameter type corresponding to the ingredient identification according to the eating preference and the first ingredient parameter type; and collecting a second ingredient parameter corresponding to the second ingredient parameter type according to the second ingredient parameter type; and the present ingredient parameter of the target ingredient is identified according to the first ingredient parameter and the second ingredient parameter, the present ingredient parameter also including a combination of one or more of a present ingredient weight, a present ingredient amount, a present ingredient shape, a present ingredient volume, a present ingredient humidity, a present ingredient color and a present degree of softness or hardness.

It is evident that, by performing the apparatus described in the present embodiment of the application, the corresponding eating preference may be identified according to the ingredient identification; the second ingredient parameter type may be identified according to the eating preference and the first ingredient parameter type; and the present ingredient parameter may be identified according to the collected ingredient parameter, in which the accuracy of identifying the ingredient parameter type may be improved, which may improve the accuracy and efficiency of the ingredient parameter corresponding to the collected ingredient parameter type, which may improve the cooking accuracy, which is beneficial to improve the compatibility between the cooked cuisine and the preference of the diner.

Figure 4:
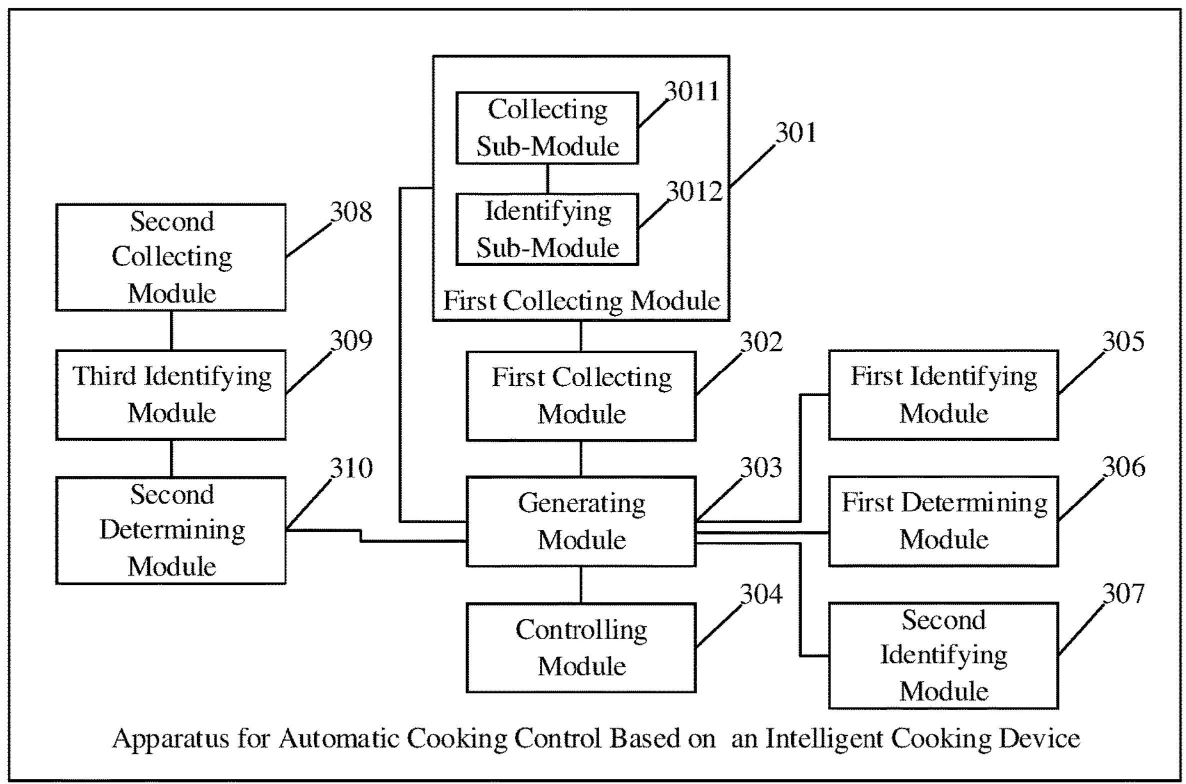
FIG. 4 is a structural diagram of another apparatus for automatic cooking control based on an intelligent cooking device disclosed in an embodiment of the present application.

In an optional embodiment, as shown in FIG. 4, the apparatus may also include:

a first identifying module 305, used for, before the generating module 303 generates a first cooking control parameter of the intelligent cooking device according to the present ingredient parameter, the present cooking temperature and the present cooking gear, identifying a present cooking process, an ingredient parameter standard corresponding to the present cooking process and a cooking temperature standard corresponding to the present cooking process, the present cooking process being one of cooking processes of a cooking flow corresponding to the target ingredient, the cooking process including at least one cooking step;

the steps of the generating module 303 generating a first cooking control parameter of the intelligent cooking device according to the present ingredient parameter, the present cooking temperature and the present cooking gear may include:

identifying an ingredient parameter difference according to the present ingredient parameter and the ingredient parameter standard;

identifying a cooking temperature difference according to the present cooking temperature and the cooking temperature standard;

identifying a standard adjustment factor according to the ingredient parameter difference and the cooking temperature difference based on a preset cooking control algorithm;

adjusting the ingredient parameter standard and the cooking temperature standard according to the standard adjustment factor to acquire a present ingredient parameter standard and a present cooking temperature standard; and generating a first cooking control parameter of the intelligent cooking device according to the present ingredient parameter standard, the present cooking temperature standard and the present cooking gear.

It is evident that, by performing the apparatus described in the present embodiment of the application, before generating the first cooking control parameter, the ingredient parameter standard corresponding to the present cooking process and the cooking temperature standard corresponding to the present cooking process may be identified, and the ingredient parameter difference and the cooking temperature difference may be identified; the present ingredient parameter standard and the present cooking temperature standard are acquired by adjusting according to the standard adjustment factor identified based on the cooking control algorithm; the first cooking control parameter is generated according to the present ingredient parameter standard, the present cooking temperature standard and the present cooking gear, which may achieve that the temperature standard and the ingredient standard are adaptively adjusted according to the actual cooking situation, which may improve the accuracy of adjusting the ingredient parameter standard and the cooking temperature standard, which may improve the accuracy of identifying the cooking control parameter, which is beneficial to improve the efficiency and accuracy of the cooking control.

In an optional embodiment, as shown in FIG. 4, the apparatus may also include:

a first determining module 306, used for, before the generating module 303 generates a first cooking control parameter of the intelligent cooking device according to the present ingredient parameter, the present cooking temperature and the present cooking gear, determining whether the target ingredient meets a preset cooking condition; when it is determined that the target ingredient meets the preset cooking condition, triggering the generating module 303 to perform an operation of generating a first cooking control parameter of the intelligent cooking device according to the present ingredient parameter, the present cooking temperature and the present cooking gear;

steps of the first determining module 306 determining whether the target ingredient meets a preset cooking condition may include:

identifying a doneness weight range corresponding to the target ingredient based on a range-identifying factor, the range-identifying factor including a combination of one or more of an actual cooking process, actual cooking duration, original ingredient weight of the target ingredient and a cooking objective corresponding to the target ingredient, the actual cooking process including cooking steps actually performed from a beginning of a cooking operation to a current moment in time;

collecting a real-time ingredient weight of the target ingredient;

determining whether the real-time ingredient weight falls within the doneness weight range; and identifying that the target ingredient meets the preset cooking condition when it is determined that the real-time ingredient weight does not fall within the doneness weight range.

It is evident that, by performing the apparatus described in the present embodiment of the application, the operation of generating a first cooking control parameter of the intelligent cooking device according to the present ingredient parameter is only performed when it is determined that the target ingredient meets the preset cooking condition; the doneness weight range corresponding to the target ingredient is determined based on the range-identifying factor, and if the real-time ingredient weight of the target ingredient does not fall within the doneness weight range, then the target ingredient meets the preset cooking condition; or else the target ingredient does not meet the preset cooking condition, which may improve the accuracy of performing the operation of generating the cooking control parameter, which is beneficial to improve the efficiency and accuracy of cooking control.

In an optional embodiment, as shown in FIG. 4, the apparatus may also include:

a second identifying module 307, used for, before the generating module 303 generates a first cooking control parameter of the intelligent cooking device according to the present ingredient parameter, the present cooking temperature and the present cooking gear, identifying a pending adjusting cooking device according to the present cooking temperature and the present cooking gear, the pending adjusting cooking device being the intelligent cookware and/or the intelligent stove;

- a first cooking control parameter of the intelligent cooking device includes at least a first cooking control parameter of the pending adjusting cooking device;
- when the pending adjusting cooking device includes the intelligent stove and the intelligent stove is a gas stove, a first stove control parameter of the intelligent stove includes a combination of one or more of a flame distribution position, a flame density, a flame temperature, a flame jet strength, a flame blast direction and a flame blast duration; and
- when the pending adjusting cooking device includes the intelligent stove and the intelligent stove is an induction stove, a first stove control parameter of the intelligent stove includes a combination of one or more of an induction stove power, a power duration and a heating position.

It is evident that, by performing the apparatus described in the present embodiment of the application, the pending adjusting cooking device may be identified according to the present cooking temperature and the present cooking gear, and the stove control parameter of the intelligent stove may be specifically identified according to the intelligent stove type, which may improve the accuracy of identifying the pending adjusting cooking device, which may improve the accuracy of identifying the cooking control parameter to be generated, thereby improving the generating efficiency of the cooking control parameter.

In an optional embodiment, as shown in FIG. 4, the apparatus may also include:

- a second collecting module 308, used for, after the controlling module 304 controls the intelligent cooking device to cook the target ingredient according to the first cooking control parameter of the intelligent cooking device, collecting a real-time ingredient color of the target ingredient and a real-time softness degree of the target ingredient;
- a third identifying module 309, used for identifying a real-time doneness degree of the target ingredient according to the real-time ingredient color and the real-time softness degree;
- a second determining module 310, used for determining whether the real-time doneness degree meets a preset doneness degree requirement;
- the generating module 303 is also used for, when the second determining module 310 determines that the real-time doneness degree does not meet the doneness degree requirement, generating a second cooking control parameter of the intelligent cooking device according to the real-time doneness degree and the doneness degree requirement;
- the controlling module 304 is also used for controlling the intelligent cooking device to cook the target ingredient according to the second cooking control parameter of the intelligent cooking device so that the doneness degree of the target ingredient meets the preset doneness degree requirement.

It is evident that, by performing the apparatus described in the present embodiment of the application, after performing the cooking operations according to the first cooking control parameter, the real-time doneness degree of the target ingredient is identified according to the collected real-time ingredient color and real-time doneness degree of the target ingredient; the second cooking control parameter of the intelligent cooking device is generated according to the real-time doneness degree and the doneness degree requirement when it is determined that the real-time doneness degree does not meet the doneness degree requirement; and the cooking operations is performed continuously according to the second cooking control parameter, which may improve the accuracy of identifying the cooking control process, which may improve the accuracy of identifying the second cooking control parameter, which is beneficial to improve the accuracy of the cooking control.

Embodiment 4

Figure 5:
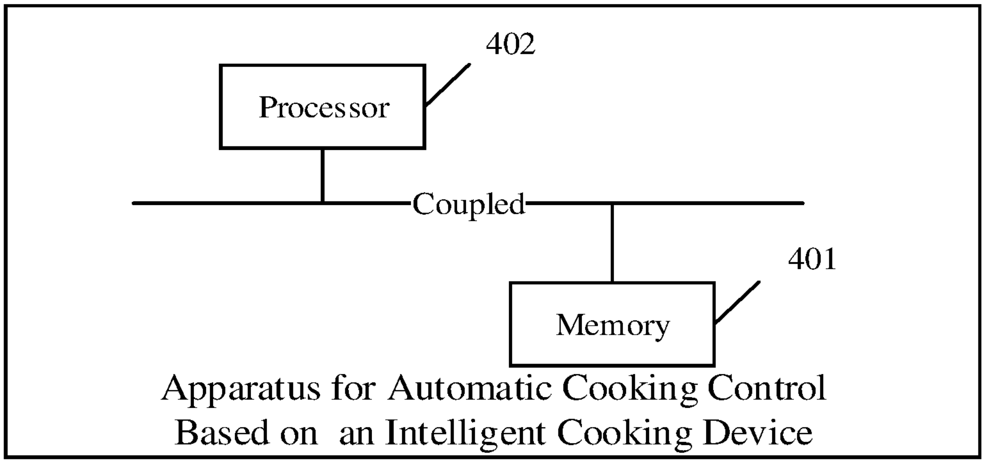
FIG. 5 is a structural diagram of a further apparatus for automatic cooking control based on an intelligent cooking device disclosed in an embodiment of the present application.

Referring to FIG. 5, FIG. 5 is a structural diagram of a third apparatus for automatic cooking control based on an intelligent cooking device disclosed in the present embodiment of the application. As shown in FIG. 5, the apparatus for automatic cooking control based on an intelligent cooking device may include:

- a memory 401, memorized with an executable code; and
- a processor 402, coupled with the memory 401,
- wherein the processor 402 invokes the executable code memorized in the memory 401 to perform steps of the method for automatic cooking control based on an intelligent cooking device as described in embodiment 1 of the present application or embodiment 2 of the present application.

Embodiment 5

Disclosed in the present embodiment of the application is a non-transitory computer memory medium, the non-transitory computer memory medium memorizes computer instructions; when the computer instructions are invoked, steps of the method for automatic cooking control based on an intelligent cooking device described in the embodiment 1 and embodiment 2 of the present application are performed.

Embodiment 6

Disclosed in the present embodiment of the application is a computer program product, the computer program product including a non-instantaneous computer readable memory medium memorized with a computer program. The computer program may be operated to enable the computer to perform steps in the method for automatic cooking control based on an intelligent cooking device described in the embodiment 1 or embodiment 2.

The aforementioned described embodiment of the apparatus is only illustrative. The modules described as separate components may or may not be physically separated, and the modules used as components for display may or may not be physical modules, that is, they may be located in the same place or may be distributed to a plurality of network modules. Some or all these modules may be selected according to practical demands to achieve the purpose of the solution of the present embodiment. It may be understood and performed by a person of ordinary skill in the art without inventive effort.

With the specific description of the above embodiments, it is clear to those skilled in the art that the various implementations may be implemented with the aid of software plus the necessary common hardware platform, and of course, with the aid of hardware. Based on this understanding, the above technical solutions that essentially or contribute to the prior art may be embodied in the form of a software product which may be memorized in a computer-readable memory medium, the memory medium including Read-Only Memory, Random Access Memory, Programmable Read-only Memory, Erasable Programmable Read Only Memory, One-time Programmable Read-Only Memory, Electrically-Erasable Programmable Read-Only Memory, Compact Disc Read-Only Memory, other Compact Disc Memory, Disk Memory, Tape Memory or any other computer-readable medium that may be used to carry or memorize data.

Finally, it should be noted that the method and apparatus for automatic cooking control based on an intelligent cooking device disclosed in the embodiments of the present application are only preferred embodiments of the present application, and are only used to illustrate the technical solutions of the present application, but not to limit them. Despite the detailed description of the application with reference to the aforementioned embodiments, it should be understood, by those skilled in the art, that the technical solutions recorded in the aforementioned embodiments may still be modified, or equivalent substitutions for some of the technical features thereof may be made; which the essence of the corresponding technical solutions of these modifications or substitutions is without departing from the spirit and scope of the technical solutions of the various embodiments of the application.

The invention claimed is:

1. A method for automatic cooking control based on an intelligent cooking device, characterized in that the method is applied to an intelligent cooking device, the intelligent cooking device comprising an intelligent cookware and an intelligent stove, the method comprising:

collecting a present ingredient parameter of a target ingredient in the intelligent cookware and a present cooking temperature of the intelligent cookware, the present ingredient parameter comprising at least an ingredient identification;

acquiring a present cooking gear of the intelligent stove;

generating a first cooking control parameter of the intelligent cooking device according to the present ingredient parameter, the present cooking temperature and the present cooking gear, the first cooking control parameter of the intelligent cooking device comprising at least a first stove control parameter of the intelligent stove and/or a first cookware control parameter of the intelligent cookware; and controlling the intelligent cooking device to cook the target ingredient according to the first cooking control parameter of the intelligent cooking device;

the collecting the present ingredient parameter of the target ingredient comprises: collecting an ingredient identification of the target ingredient in the intelligent cookware;

identifying a first ingredient parameter type corresponding to the ingredient identification according to the ingredient identification, the first ingredient parameter type comprising at least one ingredient parameter type corresponding to the ingredient identification selected from all ingredient parameter types; and collecting the present ingredient parameter of the target ingredient according to the first ingredient parameter type;

before collecting the present ingredient parameter of the target ingredient according to the first ingredient parameter type, the method also comprises: identifying an eating preference corresponding to the ingredient identification according to the ingredient identification, the eating preference being used for indicating an eating preference of a diner with respect to the ingredient identification corresponding to the target ingredient; wherein the collecting the present ingredient parameter of the target ingredient according to the first ingredient parameter type comprises:

collecting a first ingredient parameter corresponding to the first ingredient parameter type; identifying a second ingredient parameter type corresponding to the ingredient identification according to the eating preference and the first ingredient parameter type; and collecting a second ingredient parameter corresponding to the second ingredient parameter type, wherein the present ingredient parameter of the target ingredient is identified according to the first ingredient parameter and the second ingredient parameter, the present ingredient parameter also comprising a combination of one or more of a present ingredient weight, a present ingredient amount, a present ingredient shape, a present ingredient volume, a present ingredient humidity, a present ingredient color and a present degree of softness or hardness.

2. The method for automatic cooking control based on an intelligent cooking device according to claim 1, characterized in that before generating a first cooking control parameter of the intelligent cooking device according to the present ingredient parameter, the present cooking temperature and the present cooking gear, the method also comprises:

identifying a present cooking process, an ingredient parameter standard corresponding to the present cooking process and a cooking temperature standard corresponding to the present cooking process, the present cooking process being one of cooking processes of a cooking flow corresponding to the target ingredient, the cooking process comprising at least one cooking step;

generating a first cooking control parameter of the intelligent cooking device according to the present ingredient parameter, the present cooking temperature and the present cooking gear comprises:

identifying an ingredient parameter difference according to the present ingredient parameter and the ingredient parameter standard;

identifying a cooking temperature difference according to the present cooking temperature and the cooking temperature standard;

identifying a standard adjustment factor according to the ingredient parameter difference and the cooking temperature difference based on a preset cooking control algorithm;

adjusting the ingredient parameter standard and the cooking temperature standard according to the standard adjustment factor to acquire a present ingredient parameter standard and a present cooking temperature standard; and generating a first cooking control parameter of the intelligent cooking device according to the present ingredient parameter standard, the present cooking temperature standard and the present cooking gear.

3. The method for automatic cooking control based on an intelligent cooking device according to claim 2, characterized in that before generating a first cooking control parameter of the intelligent cooking device according to the present ingredient parameter, the present cooking temperature and the present cooking gear, the method also comprises:

identifying a pending adjusting cooking device according to the present cooking temperature and the present cooking gear, the pending adjusting cooking device being the intelligent cookware and/or the intelligent stove;

a first cooking control parameter of the intelligent cooking device comprises at least a first cooking control parameter of the pending adjusting cooking device;

when the pending adjusting cooking device includes the intelligent stove and the intelligent stove is a gas stove, a first stove control parameter of the intelligent stove comprises a combination of one or more of a flame distribution position, a flame density, a flame temperature, a flame jet strength, a flame blast direction and a flame blast duration; and when the pending adjusting cooking device includes the intelligent stove and the intelligent stove is an induction stove, a first stove control parameter of the intelligent stove comprises a combination of one or more of an induction stove power, a power duration and a heating position.

4. The method for automatic cooking control based on an intelligent cooking device according to claim 2, characterized in that after controlling the intelligent cooking device to cook the target ingredient according to the first cooking control parameter of the intelligent cooking device, the method also comprises:

collecting a real-time ingredient color of the target ingredient and a real-time softness degree of the target ingredient;

identifying a real-time doneness degree of the target ingredient according to the real-time ingredient color and the real-time softness degree;

determining whether the real-time doneness degree meets a preset doneness degree requirement;

when it is determined that the real-time doneness degree does not meet the doneness degree requirement, generating a second cooking control parameter of the intelligent cooking device according to the real-time doneness degree and the doneness degree requirement; and controlling the intelligent cooking device to cook the target ingredient according to the second cooking control parameter of the intelligent cooking device so that the doneness degree of the target ingredient meets the preset doneness degree requirement.

5. The method for automatic cooking control based on an intelligent cooking device according to claim 1, characterized in that before generating a first cooking control parameter of the intelligent cooking device according to the present ingredient parameter, the present cooking temperature and the present cooking gear, the method also comprises:

determining whether the target ingredient meets a preset cooking condition;

when it is determined that the target ingredient meets the preset cooking condition, triggering to perform an operation of generating a first cooking control parameter of the intelligent cooking device according to the present ingredient parameter, the present cooking temperature and the present cooking gear;

determining whether the target ingredient meets a preset cooking condition comprises:

identifying a doneness weight range corresponding to the target ingredient based on a range-identifying factor, the range-identifying factor comprising a combination of one or more of an actual cooking process, actual cooking duration, original ingredient weight of the target ingredient and a cooking objective corresponding to the target ingredient, the actual cooking process comprising cooking steps actually performed from a beginning of a cooking operation to a current moment in time;

collecting a real-time ingredient weight of the target ingredient;

determining whether the real-time ingredient weight falls within the doneness weight range; and identifying that the target ingredient meets the preset cooking condition when it is determined that the real-time ingredient weight does not fall within the doneness weight range.

6. The method for automatic cooking control based on an intelligent cooking device according to claim 5, characterized in that before generating a first cooking control parameter of the intelligent cooking device according to the present ingredient parameter, the present cooking temperature and the present cooking gear, the method also comprises:

identifying a pending adjusting cooking device according to the present cooking temperature and the present cooking gear, the pending adjusting cooking device being the intelligent cookware and/or the intelligent stove;

a first cooking control parameter of the intelligent cooking device comprises at least a first cooking control parameter of the pending adjusting cooking device;

when the pending adjusting cooking device includes the intelligent stove and the intelligent stove is a gas stove, a first stove control parameter of the intelligent stove comprises a combination of one or more of a flame distribution position, a flame density, a flame temperature, a flame jet strength, a flame blast direction and a flame blast duration; and when the pending adjusting cooking device includes the intelligent stove and the intelligent stove is an induction stove, a first stove control parameter of the intelligent stove comprises a combination of one or more of an induction stove power, a power duration and a heating position.

7. The method for automatic cooking control based on an intelligent cooking device according to claim 5, characterized in that after controlling the intelligent cooking device to cook the target ingredient according to the first cooking control parameter of the intelligent cooking device, the method also comprises:

collecting a real-time ingredient color of the target ingredient and a real-time softness degree of the target ingredient;

identifying a real-time doneness degree of the target ingredient according to the real-time ingredient color and the real-time softness degree;

determining whether the real-time doneness degree meets a preset doneness degree requirement;

when it is determined that the real-time doneness degree does not meet the doneness degree requirement, generating a second cooking control parameter of the intelligent cooking device according to the real-time doneness degree and the doneness degree requirement; and controlling the intelligent cooking device to cook the target ingredient according to the second cooking control parameter of the intelligent cooking device so that the doneness degree of the target ingredient meets the preset doneness degree requirement.

8. The method for automatic cooking control based on an intelligent cooking device according to claim 1, characterized in that before generating a first cooking control parameter of the intelligent cooking device according to the present ingredient parameter, the present cooking temperature and the present cooking gear, the method also comprises:

identifying a pending adjusting cooking device according to the present cooking temperature and the present cooking gear, the pending adjusting cooking device being the intelligent cookware and/or the intelligent stove;

a first cooking control parameter of the intelligent cooking device comprises at least a first cooking control parameter of the pending adjusting cooking device;

when the pending adjusting cooking device includes the intelligent stove and the intelligent stove is a gas stove, a first stove control parameter of the intelligent stove comprises a combination of one or more of a flame distribution position, a flame density, a flame temperature, a flame jet strength, a flame blast direction and a flame blast duration; and when the pending adjusting cooking device includes the intelligent stove and the intelligent stove is an induction stove, a first stove control parameter of the intelligent stove comprises a combination of one or more of an induction stove power, a power duration and a heating position.

9. The method for automatic cooking control based on an intelligent cooking device according to claim 1, characterized in that after controlling the intelligent cooking device to cook the target ingredient according to the first cooking control parameter of the intelligent cooking device, the method also comprises:

collecting a real-time ingredient color of the target ingredient and a real-time softness degree of the target ingredient;

identifying a real-time doneness degree of the target ingredient according to the real-time ingredient color and the real-time softness degree;

determining whether the real-time doneness degree meets a preset doneness degree requirement;

when it is determined that the real-time doneness degree does not meet the doneness degree requirement, generating a second cooking control parameter of the intelligent cooking device according to the real-time doneness degree and the doneness degree requirement; and controlling the intelligent cooking device to cook the target ingredient according to the second cooking control parameter of the intelligent cooking device so that the doneness degree of the target ingredient meets the preset doneness degree requirement.

10. An apparatus for automatic cooking control based on an intelligent cooking device, characterized in that the apparatus is applied to an intelligent cooking device, the intelligent cooking device comprising an intelligent cookware and an intelligent stove, the apparatus comprising a processor, the processor configured as:

a first collecting module to collect a present ingredient parameter of a target ingredient in the intelligent cookware and a present cooking temperature of the intelligent cookware, the present ingredient parameter comprising at least an ingredient identification;

an acquiring module to acquire a present cooking gear of the intelligent stove;

a generating module to generate a first cooking control parameter of the intelligent cooking device according to the present ingredient parameter, the present cooking temperature and the present cooking gear, the first cooking control parameter of the intelligent cooking device comprising at least a first stove control parameter of the intelligent stove and/or a first cookware control parameter of the intelligent cookware; and a controlling module to control the intelligent cooking device to cook the target ingredient according to the first cooking control parameter of the intelligent cooking device;

the first collecting module comprises:

a collecting sub-module, used for collecting an ingredient identification of the target ingredient in the intelligent cookware;

an identifying sub-module, used for identifying a first ingredient parameter type corresponding to the ingredient identification according to the ingredient identification, the first ingredient parameter type including at least one ingredient parameter type corresponding to the ingredient identification selected from all ingredient parameter types; and the collecting sub-module is also used for collecting the present ingredient parameter of the target ingredient according to the first ingredient parameter type;

the identifying sub-module is also used for, before the collecting sub-module collects the present ingredient parameter of the target ingredient according to the first ingredient parameter type, identifying an eating preference corresponding to the ingredient identification according to the ingredient identification, the eating preference being used for indicating an eating preference of a diner with respect to the ingredient identification corresponding to the target ingredient;

steps of the collecting sub-module collecting the present ingredient parameter of the target ingredient according to the first ingredient parameter type specifically comprise:

collecting a first ingredient parameter corresponding to the first ingredient parameter type;

identifying a second ingredient parameter type corresponding to the ingredient identification according to the eating preference and the first ingredient parameter type;

and collecting a second ingredient parameter corresponding to the second ingredient parameter type, wherein the present ingredient parameter of the target ingredient is identified according to the first ingredient parameter and the second ingredient parameter, the present ingredient parameter also including a combination of one or more of a present ingredient weight, a present ingredient amount, a present ingredient shape, a present ingredient volume, a present ingredient humidity, a present ingredient color and a present degree of softness or hardness.

11. An apparatus for automatic cooking control based on an intelligent cooking device, characterized in that the apparatus comprises:

a memory, memorized with an executable code; and a processor, coupled with the memory, wherein the processor invokes the executable code memorized in the memory to perform a method for automatic cooking control based on an intelligent cooking device, wherein the method is applied to an intelligent cooking device, the intelligent cooking device comprising an intelligent cookware and an intelligent stove, the method comprising:

collecting a present ingredient parameter of a target ingredient in the intelligent cookware and a present cooking temperature of the intelligent cookware, the present ingredient parameter comprising at least an ingredient identification;

acquiring a present cooking gear of the intelligent stove;

generating a first cooking control parameter of the intelligent cooking device according to the present ingredient parameter, the present cooking temperature and the present cooking gear, the first cooking control parameter of the intelligent cooking device comprising at least a first stove control parameter of the intelligent stove and/or a first cookware control parameter of the intelligent cookware; and controlling the intelligent cooking device to cook the target ingredient according to the first cooking control parameter of the intelligent cooking device; the collecting the present ingredient parameter of the target ingredient comprises:

collecting an ingredient identification of the target ingredient in the intelligent cookware;

identifying a first ingredient parameter type corresponding to the ingredient identification according to the ingredient identification, the first ingredient parameter type comprising at least one ingredient parameter type corresponding to the ingredient identification selected from all ingredient parameter types; and collecting the present ingredient parameter of the target ingredient according to the first ingredient parameter type;

before collecting the present ingredient parameter of the target ingredient according to the first ingredient parameter type, the method also comprises:

identifying an eating preference corresponding to the ingredient identification according to the ingredient identification, the eating preference being used for indicating an eating preference of a diner with respect to the ingredient identification corresponding to the target ingredient;

wherein the collecting the present ingredient parameter of the target ingredient according to the first ingredient parameter type comprises:

collecting a first ingredient parameter corresponding to the first ingredient parameter type;

identifying a second ingredient parameter type corresponding to the ingredient identification according to the eating preference and the first ingredient parameter type; and collecting a second ingredient parameter corresponding to the second ingredient parameter type, wherein the present ingredient parameter of the target ingredient is identified according to the first ingredient parameter and the second ingredient parameter, the present ingredient parameter also comprising a combination of one or more of a present ingredient weight, a present ingredient amount, a present ingredient shape, a present ingredient volume, a present ingredient humidity, a present ingredient color and a present degree of softness or hardness.

* * * * *